US008922586B2

(12) United States Patent
Duran et al.

(10) Patent No.: US 8,922,586 B2
(45) Date of Patent: Dec. 30, 2014

(54) ELECTRONIC DEVICE WITH REDUCED FORM FACTOR

(75) Inventors: Jose R. Duran, Williamson, NY (US); David Cipolla, Macedon, NY (US); Jason Scott, W. Henrietta, NY (US); Richard S. Currier, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 336 days.

(21) Appl. No.: 13/570,359

(22) Filed: Aug. 9, 2012

(65) Prior Publication Data

US 2014/0043362 A1 Feb. 13, 2014

(51) Int. Cl.
*G09G 5/00* (2006.01)
(52) U.S. Cl.
USPC .......................................... 345/629; 381/337
(58) Field of Classification Search
CPC ....................................................... H04R 1/025
USPC .......................................... 345/629; 381/337
See application file for complete search history.

(56) References Cited

U.S. PATENT DOCUMENTS

| 8,103,043 | B2 | 1/2012 | Williams et al. |
| 2003/0006968 | A1* | 1/2003 | Solomon .................... 345/168 |
| 2004/0228501 | A1* | 11/2004 | Saiki et al. .................... 381/423 |
| 2010/0210298 | A1* | 8/2010 | Williams et al. ............ 455/550.1 |

* cited by examiner

*Primary Examiner* — Maurice L McDowell, Jr.
*Assistant Examiner* — Kyle Zhai
(74) *Attorney, Agent, or Firm* — Robert J. Sacco, Esq.; Fox Rothschild LLP

(57) ABSTRACT

Systems and methods (1000) for reducing a form factor of an Electronic Device ("ED"). The methods involve disposing a first user interface component (702) in a housing (710) of ED (700) such that its center axis (718) is at an angle (720) relative to a plane (722) that is perpendicular to a horizontal center axis (712) of ED. A second user interface component (704) is disposed in the housing such that its center axis (724) is parallel to the horizontal center axis of ED, and such that a top portion (734) thereof is overlapped by a bottom portion (732) of the first user interface component. A third user interface component (706) is disposed in the housing such that its center axis (726) is parallel to the horizontal center axis of ED, and such that a top portion (730) thereof overlaps a bottom portion (728) of the second user interface component.

16 Claims, 6 Drawing Sheets

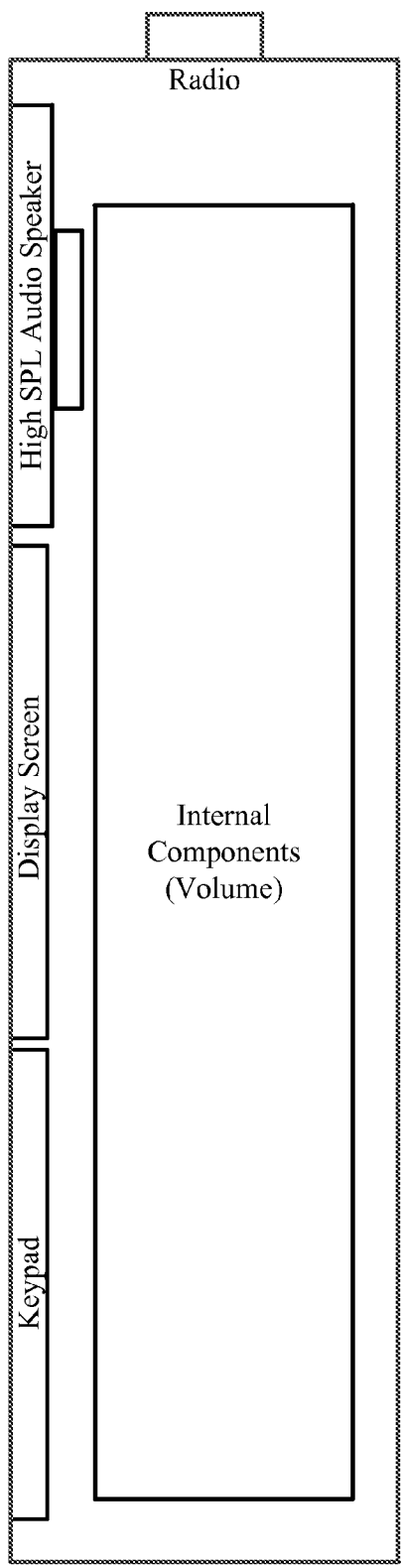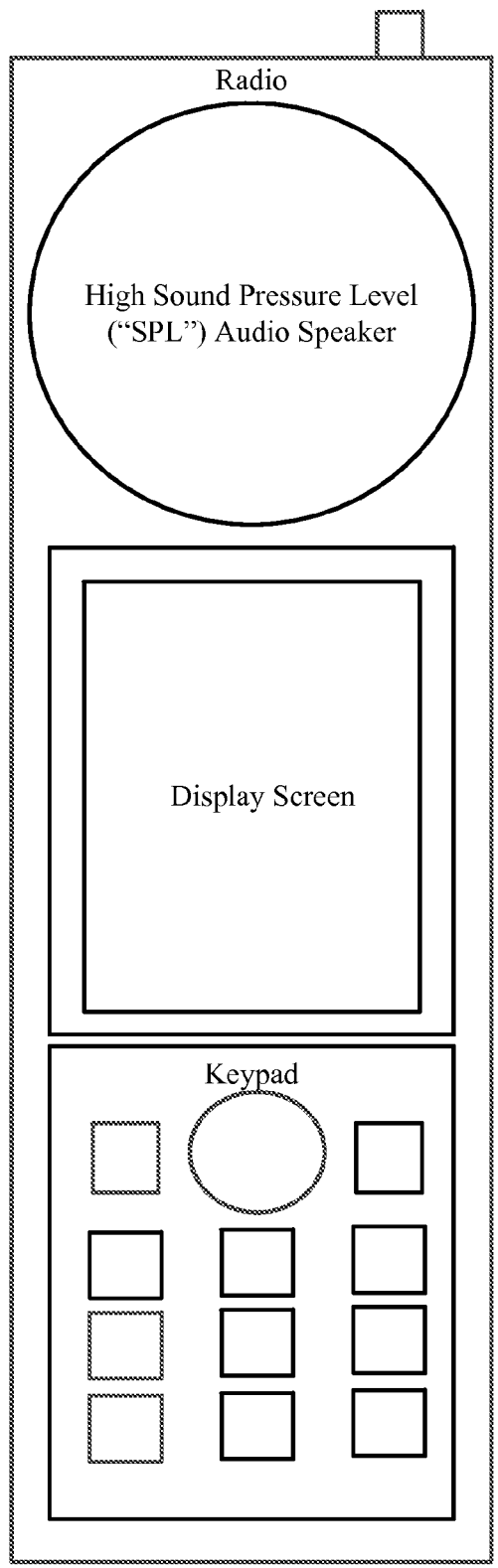

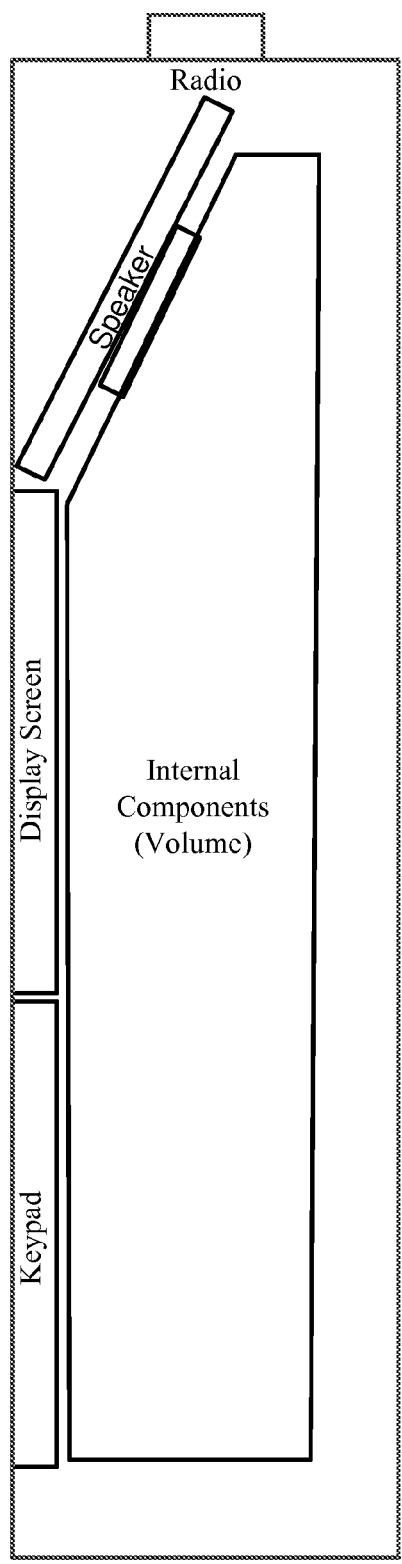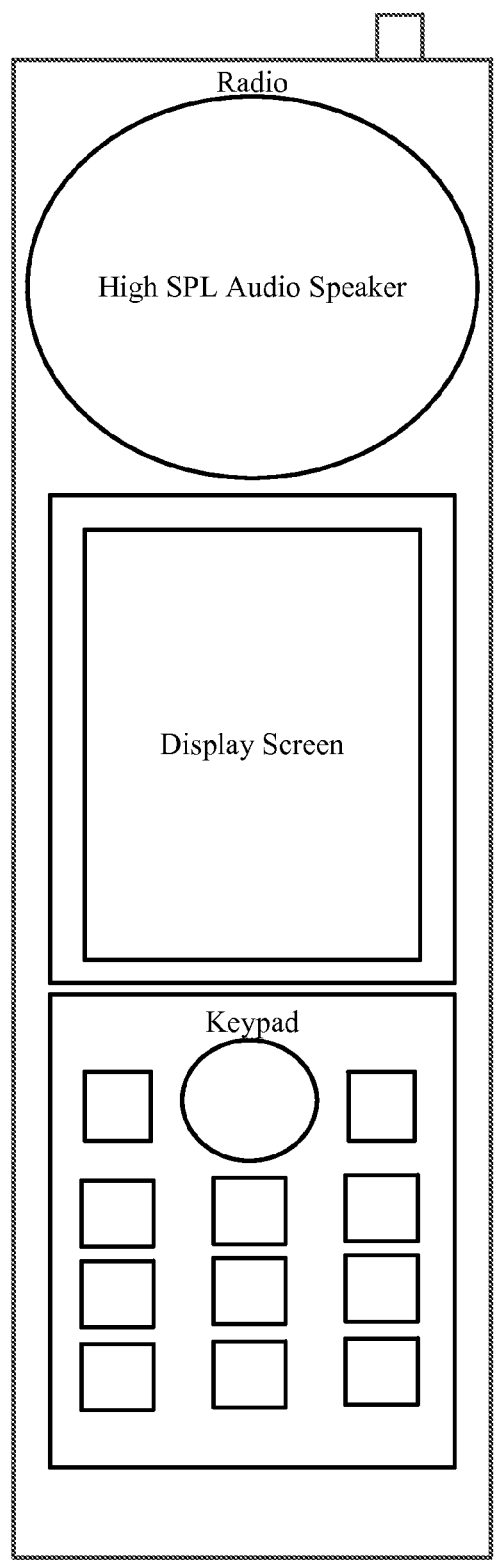
FIG. 5
(Prior Art)
FIG. 6
(Prior Art)

ELECTRONIC DEVICE WITH REDUCED FORM FACTOR

BACKGROUND OF THE INVENTION

1. Statement of the Technical Field

The invention concerns electronic devices. More particularly, the invention concerns electronic devices having reduced form factors.

2. Description of the Related Art

There are various types of communication devices known in the art which facilitate communication among users remotely located from one another. One such communication device is a portable radio. The portable radio comprises a plurality of internal components that are encased in a housing thereof and a plurality of interface components which are disposed in the housing so as to be at least partially accessible to a user thereof. The interface components typically include a high Sound Pressure Level ("SPL") audio speaker, a display screen and a keypad. In some conventional radios, the listed interface components are arranged thereon so that they do not overlap each other, but are horizontally aligned with each other as shown in FIGS. 1-2. Accordingly, each of the components has a horizontal center axis which is parallel with a horizontal center axis of the radio.

In other conventional radios, the display screen and keypad are arranged in the same manner as described above, i.e., they do not overlap each other and have horizontal center axes that are parallel to the horizontal center axis of the radio. However, the high SPL audio speaker is arranged so that it is at least partially behind the display screen, i.e., the display screen partially overlaps the high SPL speaker, as shown in FIGS. 3-4. This component overlapping configuration provides a radio with a decreased overall height as compared to that of the radio shown in FIGS. 1-2. Notably, the width of the radio shown in FIGS. 3-4 is larger than that of the radio shown in FIGS. 1-2. Also, the acoustic experience quality of users of the radio of FIGS. 3-4 is not as good as that of the radio of FIGS. 1-2.

In yet other conventional radios, the display screen and keypad are arranged in the same manner as described above, i.e., they do not overlap each other and have horizontal center axes that are parallel to the horizontal center axis of the radio. However, the high SPL audio speaker is arranged on the radio so that its horizontal center axis is angled toward the rear of the radio, i.e., the high SPL speaker has an "angled orientation" relative to the horizontal center axis of the radio, as shown in FIGS. 5-6. As a result of this "angled orientation", the radio of FIGS. 5-6 has a smaller height as compared to the radio of FIGS. 1-2. Notably, the width of the radio shown in FIGS. 5-6 is the same as or substantially similar to that of the radio shown in FIGS. 1-2.

SUMMARY OF THE INVENTION

Embodiments of the present invention concern systems and methods for reducing a form factor of an electronic device. The methods involve disposing a first user interface component (e.g., a electroacoustic transducer) in a housing of the electronic device such that a center axis thereof is at an angle relative to a plane that is perpendicular to a horizontal center axis of the electronic device. The angle can be an acute angle or an obtuse angle. A second user interface component (e.g., a display screen) is disposed in the housing of the electronic device such that a center axis thereof is parallel to the horizontal center axis of the electronic device. A top portion of the second user interface component is overlapped by a bottom portion of the first user interface component. In effect, a user is prevented from viewing the top portion of the second user interface component. A third user interface component is disposed in a housing of the electronic device such that a center axis thereof is parallel to the horizontal center axis of the electronic device. A top portion of the third user interface component overlaps a bottom portion of the second user interface component. Consequently, the user is also prevented from viewing the bottom portion of the second user interface component.

BRIEF DESCRIPTION OF THE DRAWINGS

Embodiments will be described with reference to the following drawing figures, in which like numerals represent like items throughout the figures, and in which:

FIG. 1 is a side view of a conventional communication device having an acoustic transducer, a display screen and a keypad which are horizontally aligned with one another.

FIG. 2 is a front view of the conventional communication device shown in FIG. 1.

FIG. 5 is a side view of another conventional communication device having an acoustic transducer with an "angled orientation" relative to a horizontal center axis of the communication device.

FIG. 6 is a front view of the conventional communication device of FIG. 5.

DETAILED DESCRIPTION

Figure 3:
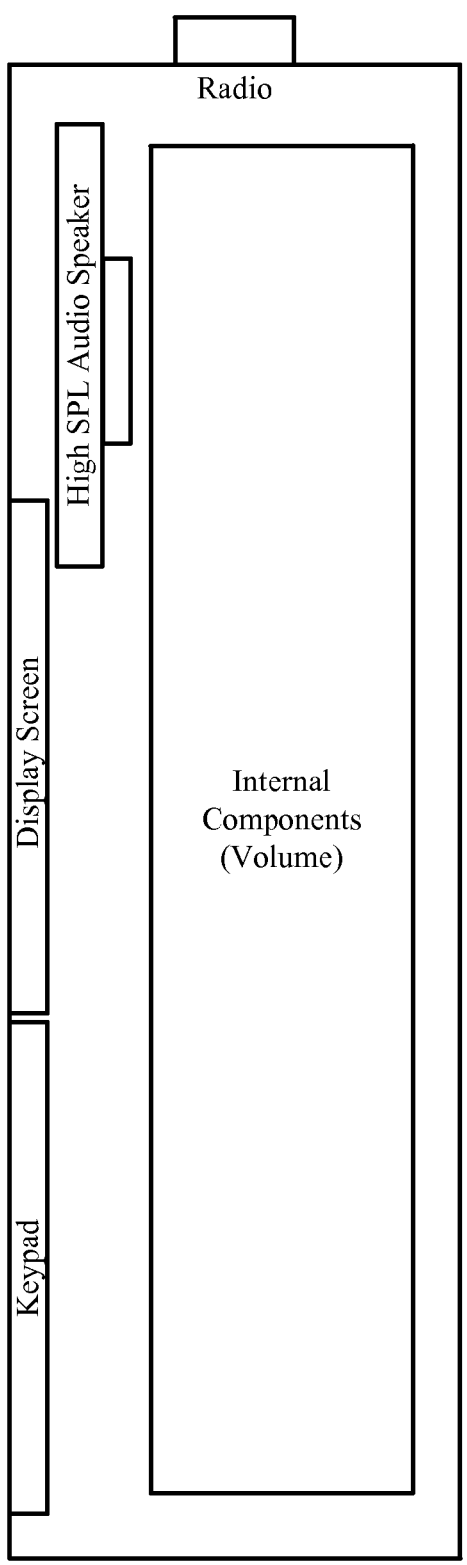
FIG. 3 is a side view of a conventional communication device having a display screen that partially overlaps an acoustic transducer.
Figure 4:
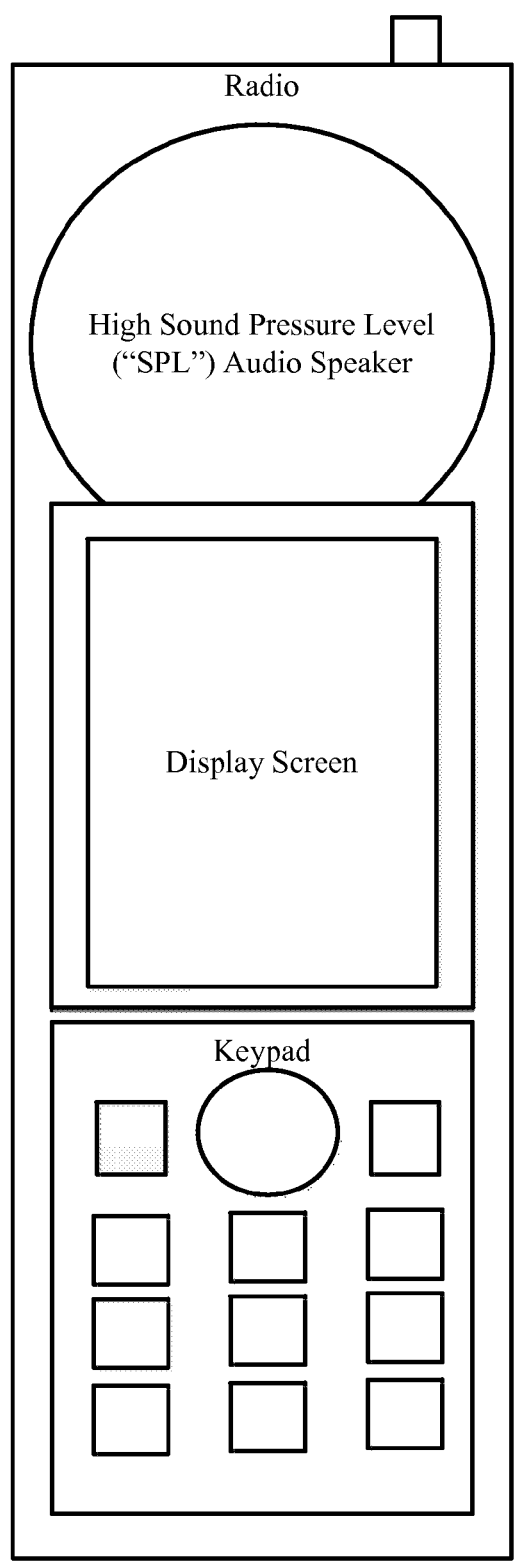
FIG. 4 is a front view of the conventional communication device of FIG. 3.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Embodiments of the present invention will now be described with respect to FIGS. 7-10. Embodiments of the present invention generally relate to systems and methods for reducing a form factor of an electronic device as compared to conventional electronic devices, such as those described above in relation to the Background Section of this document. The overall size of the electronic device is reduced by arranging components thereof is a manner that ensures that the overall height and overall width of the electronic device are reduced by a desired amount. Generally, the present invention employs "component overlapping arrangements" and "component angled orientation arrangements". The manner in which the components are arranged will become more evident as the discussion progresses. Still, it should be understood that the component arrangements allow for the inclusion of a high SPL audio speaker, a relatively large display screen (e.g., 3.5 inch to 4.0 inch touch screen) and standard navigation keys in a "reduced form factor" electronic device.

Figure 7:
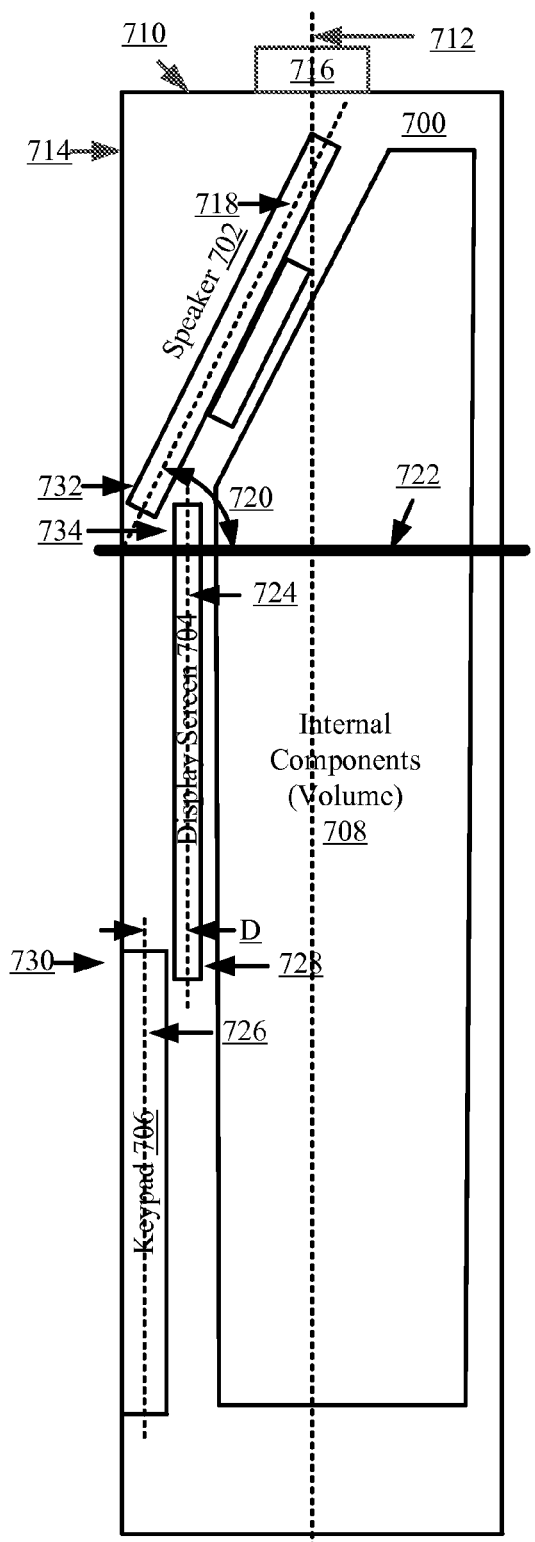
FIG. 7 is a side view of an exemplary electronic device that is useful for understanding the present invention.
Figure 8:
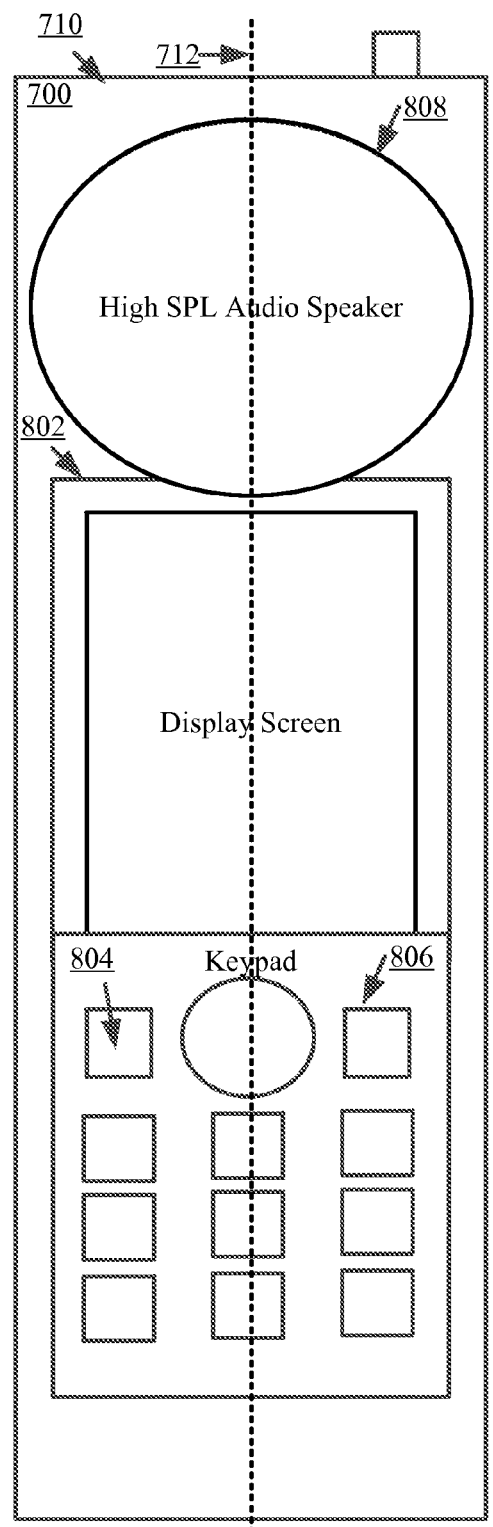
FIG. 8 is a front view of the electronic device of FIG. 7.

Referring now to FIG. 7, there is provided a side view of an exemplary electronic device 700 that is useful for understanding the present invention. A front view of the electronic device 700 is provided in FIG. 8. Although the electronic device 700 is shown in FIGS. 7-8 to be a portable radio, the invention is not limited in this regard. For example, the electronic device 700 can be a radio, a mobile telephone, a cellular telephone, an MP3 player, a personal computer, a PDA, a game pad, a video camera, a recording device, a camera, a GPS device or any other electronic device in which a reduced form factor is desirable.

As shown in FIGS. 7-8, the electronic device 700 generally comprises a housing 710 configured to house User Interface ("UI") components 702, 704, 706, internal components 708, a battery (not shown), and other electronic components (not shown). The UI components 702, 704, 706 are configured to enable user control of operations of the electronic device 700. As such, the UI components include input devices (e.g., a keypad 706), input/output devices (e.g., a touch screen 704), and output devices (e.g., an electroacoustic transducer or speaker 702). The internal components include, but are not limited to, internal circuitry (not shown) for communicating radio frequency signals to and from remotely located devices via an antenna 716. The internal circuitry (not shown) is electrically connected to the UI components 702, 704, 706 and other external controls (e.g., buttons, knobs, light emitting diodes, an antenna connector and a cable connector) of the electronic device 700. Such electrical connections facilitate the user control of operations of the electronic device 700 using the components 702-706 of a control assembly.

The housing 710 can be formed from any conductive or non-conductive material. Such conductive materials include, but are not limited to, metal materials and composite materials. Such non-conductive materials include, but are not limited to, rubbers and plastics. In some embodiments, the housing material is selected to withstand high temperatures and/or harsh environmental conditions such that the internal components 708 of the electronic device 700 are protected from damage due to external factors. Similarly, the UI components 702-706 may be at least partially formed of a material that can withstand high temperatures and/or harsh environmental conditions.

The housing 710 has a plurality of apertures formed through a front panel 714 thereof. Each of the apertures has a UI component 704 or 706 at least partially disposed therein. For example, a display screen 704 is disposed in a respective aperture 802 formed through front panel 714 such that the contents thereof can be viewed by a user of the electronic device 700. Similarly, keys 804 of a keypad 706 are disposed in respective apertures 806 formed in the front panel 714 such that they can be easily accessed by a user of the electronic device 700. The front panel 714 may include a single aperture 808 or a plurality of relatively small apertures (not shown) formed therethrough so that sound output by an electroacoustic transducer 702 can be clearly heard by the user of the electronic device 700. The electroacoustic transducer 702 can include, but is not limited to, a high SPL audio speaker. In some embodiments, watertight seals (not shown) are provided between each of the UI components 702-706 and sidewalls (not shown) of the respective aperture 802, 806, 808 via a chemical bond, a mechanical bond and/or a gasket seal.

Notably, the UI component 702 is arranged in a manner that allows a reduction in a form factor of the electronic device 700 in which it is disposed. Specifically, the electroacoustic transducer 702 is arranged so as to have an "acute angled orientation" relative to a horizontal center axis 712 of the electronic device 700. In this regard, the center axis 718 of the electroacoustic transducer 702 is at an acute angle 720 with respect to a plane 722 that is perpendicular to said horizontal center axis 712. Since the electroacoustic transducer 702 has an "angled orientation", the total volume of the internal components 708 must be decreased as compared to that of conventional electronic devices, as shown in FIG. 7.

Figure 9:
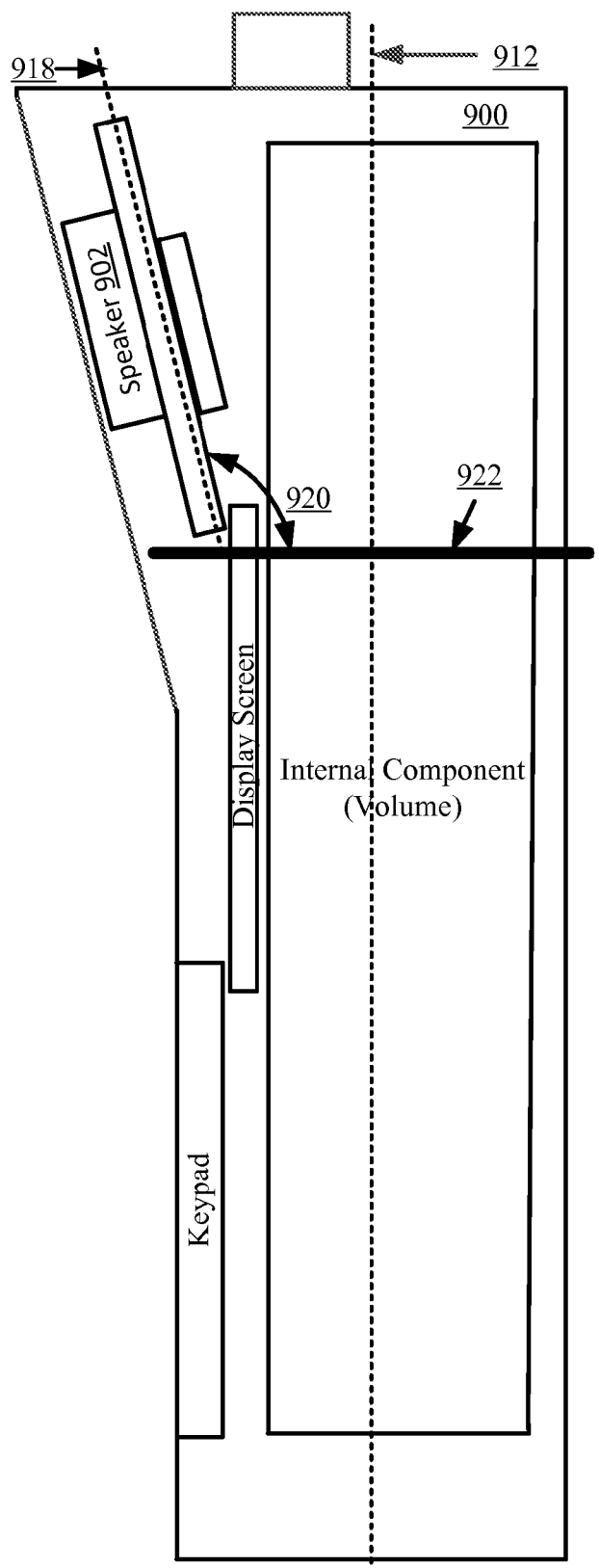
FIG. 9 is a side view of another exemplary electronic device that is useful for understanding the present invention.

Embodiments of the present invention are not limited to the "acute angled orientation" of the electroacoustic transducer 702 shown in FIGS. 7-8. For example, a electroacoustic transducer 902 can alternatively have an "obtuse angled orientation" relative to a horizontal center axis 912 of an electronic device 900, as shown in FIG. 9. In this regard, a center axis 918 of the electroacoustic transducer 902 is at an obtuse angle 920 with respect to a plane 922 that is perpendicular to said horizontal center axis 912. In this scenario, the total volume of the internal components need not be decreased as compared to that of conventional electronic devices. In fact, the total value of the internal components of electronic device 900 may be increased.

Referring again to FIGS. 7-8, the electroacoustic transducer 702 has a partial overlapping arrangement with the display screen 704. In this regard, a bottom portion 732 of the electroacoustic transducer 702 is adjacent to the front panel 714 of the housing 710. In contrast, a top portion 734 of the display screen 704 is set back from the front panel 714 by a distance that is greater than a distance between the bottom portion 732 of the electroacoustic transducer 702 and the front panel 714. Also, the bottom portion 732 of the electroacoustic transducer 702 overlaps the top portion 734 of the display screen 704 such that the display screen 704 will not interfere with sound output from electroacoustic transducer 702. Such an "overlapping arrangement" allows a reduction in a form factor of the electronic device 700, as well as provides an acoustic experience for a user of the electronic device 700 that is the same as or substantially similar to that of some conventional electronic devices (such as that shown in FIGS. 1-2).

The "overlapping arrangement" of the present invention also provides an electronic device with an improved acoustic experience of base frequency sound for users thereof as compared to that provided to users of a conventional electronic device in which at least a portion of a speaker is placed behind another user interface component (such as that described in U.S. Pat. No. 8,103,043). Also, the "overlapping arrangement" of the present invention eliminates a need for an acoustic channel to transmit sound waves produced by an electroacoustic transducer. As such, the present invention is less costly, complex and hardware intensive as compared to such conventional electronic devices (such as that described in U.S. Pat. No. 8,103,043).

Referring again FIGS. 7-8, the display screen 704 is also arranged in a manner that allows a reduction in a form factor of the electronic device 700. Specifically, the display screen 704 has a center axis 724 that is parallel to horizontal center axis 712 and perpendicular to plane 722. However, the center axis 724 of the display screen 704 is not horizontally aligned with the center axis 726 of the keypad 706. Instead, the center axis 724 of the display screen 704 is offset vertically by a distance D from the center axis 726 of the keypad 706. Also, the display screen 704 has a partially overlapping arrangement with the keypad 706. In this regard, the display screen 704 is set back from the front panel 714 of housing 710 by an amount greater than that of the keypad 706. Further, a top portion 730 of the keypad 706 overlaps a bottom portion 728 of the display screen 704. The amount of overlap between UI components 704, 706 is selected such that any content displayed on the display screen will still be entirely or substantially visible by a user of the electronic device 700.

Figure 10:
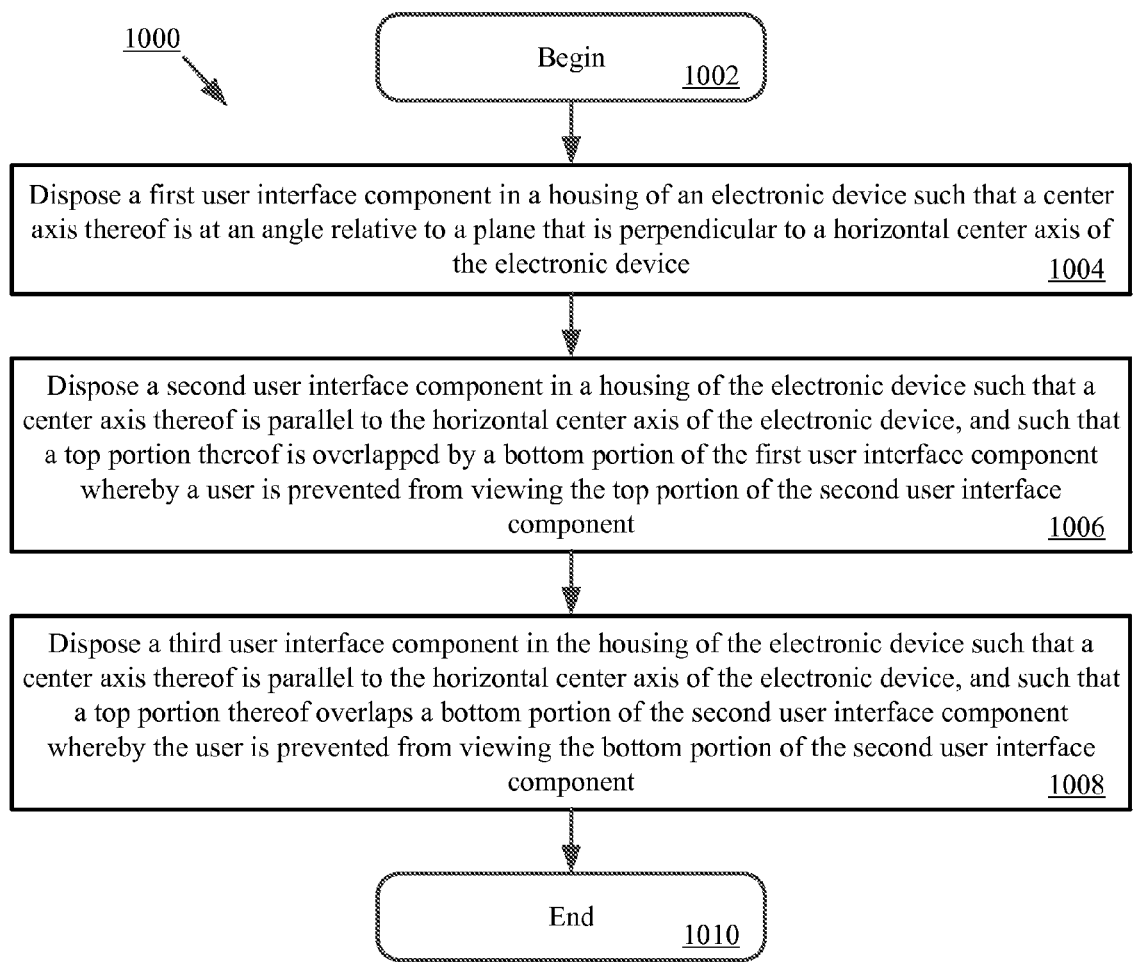
FIG. 10 is a flow diagram of an exemplary method for reducing a form factor of an electronic device.

Referring now to FIG. 10, there is provided an exemplary method 1000 for reducing a form factor of an electronic device (e.g., electronic device 700 of FIG. 7). The method 1000 begins with step 1002 and continues with step 1004. Step 1004 involves disposing a first user interface component (e.g., speaker 702 of FIG. 7) in a housing (e.g., housing 710 of FIG. 7) of the electronic device such that a center axis (e.g., axis 718 of FIG. 7) thereof is at an angle (e.g., angle 720 of FIG. 7) relative to a plane (e.g., plane 722 of FIG. 7) that is perpendicular to a horizontal center axis (e.g., axis 712 of FIG. 7) of the electronic device. The angle can be an acute angle or an obtuse angle. Next, in step 1006, a second user interface component (e.g., display screen 704 of FIG. 7) is disposed in the housing of the electronic device such that a center axis (e.g., axis 724 of FIG. 7) thereof is parallel to the horizontal center axis of the electronic device. The second user interface component is also disposed in the housing such that a top portion (e.g., top portion 734 of FIG. 7) thereof is overlapped by a bottom portion (e.g., bottom portion 732 of FIG. 7) of the first user interface component. In effect, a user is prevented from viewing the top portion of the second user interface component. A third user interface component is also disposed in the housing of the electronic device, as shown by step 1008. The third user interface component is disposed in the housing such that a center axis (e.g., axis 726 of FIG. 7) thereof is parallel to the horizontal center axis of the electronic device. The third user interface component is also disposed in the housing such that a top portion (e.g., top portion 730 of FIG. 7) thereof overlaps a bottom portion (e.g., bottom portion 728 of FIG. 7) of the second user interface component. Consequently, the user is prevented from viewing the bottom portion of the second user interface component.

As can be appreciated from the forgoing, one or more embodiments of the present invention provide for an angled sound-generation arrangement and an overlapping control arrangement. With the angled sound-generation arrangement and an overlapping control arrangement, demands by consumers for smaller portable electronic devices may be satisfied without sacrificing functionality. Further, the angled sound-generation arrangement and an overlapping control arrangement provides the manufacturer with a distinct market advantage without incurring additional expense.

Within this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one or more than one member. It should also be noted that there are many alternative ways of implementing the methods and apparatuses of the present invention. It is therefore intended that the following appended claims be interpreted as including all such alterations, permutations, and equivalents as fall within the true spirit of the present invention.

We claim:

1. A method for reducing a form factor of an electronic device, comprising:
   disposing a first user interface component in a housing of said electronic device such that a center axis thereof is at an angle relative to a plane that is perpendicular to a horizontal center axis of said electronic device, said angle exclusive of a ninety-degree angle;
   preventing a user from viewing a top portion of a second user interface component disposed in said housing of said electronic device by arranging the first and second user interface components relative to each other such that
   (1) a center axis of the second user interface component is parallel to said horizontal center axis of said electronic device and intersects a bottom portion of the first user interface component, and
   (2) only the top portion of the second user interface component is overlapped by the bottom portion of said first user interface component;
   preventing the user from viewing a bottom portion of the second user interface component by disposing a third user interface component in said housing of said electronic device and arranging the second and third user interface components relative to each other such that
   (1) a center axis of the third user interface component is parallel to said horizontal center axis of said electronic device and intersects the bottom portion of the first user interface component, (2) only a top portion of the third user interface component overlaps only the bottom portion of the second user interface component, and (3) a center axis of the third user interface component is offset from the center axis of the second user interface component.

2. The method according to claim 1, wherein said angle is an acute angle or an obtuse angle.

3. The method according to claim 1, wherein said first and second user interface components are output devices.

4. The method according to claim 1, wherein said first user interface component is an output device and said second user interface component is an input/output device.

5. The method according to claim 1, wherein said first user interface component is an output device, said second user interface component is an input/output device, and said third user interface component is an input device.

6. The method according to claim 1, wherein said first user interface component is an electroacoustic transducer, said second user interface component is a display screen, and said third user interface component is a keypad.

7. A method for reducing a form factor of an electronic device, comprising:
  disposing an electroacoustic transducer in a housing of said electronic device such that a center axis thereof is at an angle relative to a plane that is perpendicular to a horizontal center axis of said electronic device, said angle exclusive of a ninety-degree angle;
  preventing a user from viewing a top portion of a display screen disposed in said housing of said electronic device by arranging the electroacoustic transducer and display device such that
    (1) a center axis thereof is parallel to said horizontal center axis of said electronic device and intersects a bottom portion of the electroacoustic transducer, and
    (2) only the top portion of the display screen is overlapped by a bottom portion of said electroacoustic transducer; and
  preventing the user from viewing a bottom portion of the display screen by disposing a keypad in said housing of said electronic device and arranging the display screen and the keypad relative to each other such that
    (1) a center axis of the keypad is parallel to said horizontal center axis of said electronic device and intersects the bottom portion of the display screen,
    (2) only a top portion of the keypad overlaps only the bottom portion of the display screen, and
    (3) a center axis of the keypad is offset from the center axis of the display screen.

8. The method according to claim 7, wherein said angle is an acute angle or an obtuse angle.

9. An electronic device, comprising:
  a housing;
  a first user interface component disposed in said housing such that a center axis thereof is at an angle relative to a plane that is perpendicular to a horizontal center axis of said electronic device, said angle exclusive of a ninety-degree angle;
  a second user interface component disposed in said housing such that (1) a center axis thereof is parallel to said horizontal center axis of said electronic device and intersects a bottom portion of the first user interface component, and (2) only a top portion thereof is overlapped by the bottom portion of said first user interface component, whereby a user is prevented from viewing said top portion of said second user interface component; and
  a third user interface component disposed in said housing and arranged relative to the second user interface component such that (1) a center axis of the third user interface component is parallel to said horizontal center axis of said electronic device and intersects the bottom portion of the first user interface component, (2) only a top portion of the third user interface component overlaps only the bottom portion of said second user interface component, and (3) a center axis of the third user interface component is offset from the center axis of the second user interface component, whereby said user is prevented from viewing said bottom portion of said second user interface component.

10. The electronic device according to claim 9, wherein said angle is an acute angle or an obtuse angle.

11. The electronic device according to claim 9, wherein said first and second user interface components are output devices.

12. The electronic device according to claim 9, wherein said first user interface component is an output device and said second user interface component is an input/output device.

13. The electronic device according to claim 9, wherein said first user interface component is an output device, said second user interface component is an input/output device, and said third user interface component is an input device.

14. The electronic device according to claim 9, wherein said first user interface component is an electroacoustic transducer, said second user interface component is a display screen, and said third user interface component is a keypad.

15. An electronic device, comprising:
  a housing;
  an electroacoustic transducer disposed in said housing such that a center axis thereof is at an angle relative to a plane that is perpendicular to a horizontal center axis of said electronic device, said angle exclusive of a ninety-degree angle;
  a display screen disposed in said housing and arranged relative to the electroacoustic transducer such that (1) a center axis of the display screen is parallel to said horizontal center axis of said electronic device and intersects a bottom portion of the electroacoustic transducer, and (2) only a top portion of the display screen is overlapped by the bottom portion of said electroacoustic transducer, whereby a user is prevented from viewing said top portion of said display screen; and
  a keypad disposed in said housing and arranged relative to the display screen such that (1) a center axis of the keypad is parallel to said horizontal center axis of said electronic device and intersects the bottom portion of the electroacoustic transducer, (2) only a top portion of the keypad overlaps only a bottom portion of said display screen, and (3) the center axis of the keypad is offset from the center axis of the display screen, whereby said user is prevented from viewing said bottom portion of said display screen.

16. The electronic device according to claim 15, wherein said angle is an acute angle or an obtuse angle.

* * * * *